(12) United States Patent
Bentzien et al.

(10) Patent No.: US 9,092,474 B2
(45) Date of Patent: Jul. 28, 2015

(54) INCREMENTAL CONVERSION OF DATABASE OBJECTS DURING UPGRADE OF AN ORIGINAL SYSTEM

(75) Inventors: Levke Bentzien, Heidelberg (DE); Wieland Hoprich, Mannheim (DE)

(73) Assignee: SAP SE, Walldorf, DE (US)

( * ) Notice: Subject to any disclaimer, the term of this patent is extended or adjusted under 35 U.S.C. 154(b) by 135 days.

(21) Appl. No.: 12/902,475

(22) Filed: Oct. 12, 2010

(65) Prior Publication Data

US 2012/0089625 A1    Apr. 12, 2012

(51) Int. Cl.
 *G06F 17/30* (2006.01)

(52) U.S. Cl.
 CPC .................. *G06F 17/30359* (2013.01)

(58) Field of Classification Search
 CPC .................... G06F 17/30365; G06F 17/30374; G06F 17/30377
 USPC ........................... 707/624, 646, 695
 See application file for complete search history.

(56) References Cited

U.S. PATENT DOCUMENTS

| | | | |
|---|---|---|---|
| 6,105,025 A | 8/2000 | Jacobs et al. | |
| 6,151,608 A | 11/2000 | Abrams | |
| 6,385,770 B1 | 5/2002 | Sinander | |
| 6,711,560 B2 | 3/2004 | Levy et al. | |
| 6,721,725 B2 | 4/2004 | Levy et al. | |
| 6,999,977 B1 | 2/2006 | Norcott et al. | |
| 7,028,022 B1 * | 4/2006 | Lightstone et al. | 707/999.002 |
| 7,085,831 B2 | 8/2006 | Larkin | |
| 7,111,023 B2 | 9/2006 | Norcott | |
| 7,236,991 B2 | 6/2007 | Becker et al. | |
| 7,461,097 B2 | 12/2008 | Stahl et al. | |
| 7,523,142 B2 | 4/2009 | Driesen et al. | |
| 7,620,665 B1 | 11/2009 | George et al. | |
| 7,647,354 B2 | 1/2010 | Norcott | |
| 7,657,576 B1 | 2/2010 | Norcott | |
| 7,694,292 B2 | 4/2010 | Mueller et al. | |
| 7,917,475 B2 | 3/2011 | D'Souza et al. | |
| 8,060,713 B1 | 11/2011 | Natanzon | |
| 8,230,416 B2 | 7/2012 | Ivanov | |
| 8,527,471 B2 | 9/2013 | Hoprich et al. | |
| 2002/0143731 A1 | 10/2002 | Levy et al. | |

(Continued)

OTHER PUBLICATIONS

Hudson, "Slashing Downtimes with Online Patching", Oracle, 2011, 54 pages.

(Continued)

*Primary Examiner* — Khanh Pham
(74) *Attorney, Agent, or Firm* — Brake Hughes Bellermann LLP

(57) ABSTRACT

A computer system can include a database comparator configured to identify a first database object from an original system for a complete modification based on a comparison of the first database object with a plurality of target upgrade database objects, and configured to identify a second database object from the original system for a partial modification based on a comparison of the second database object with the plurality of target upgrade database objects. A complete modification module can be configured to designate, in response to the identification of the first database object, the first database object for the complete modification based on an incremental conversion process. A partial modification module can be configured to designate the second database object for the partial modification based on the incremental conversion process when an instruction to implement the partial modification satisfies at least a portion of a modification condition.

20 Claims, 6 Drawing Sheets

(56) References Cited

U.S. PATENT DOCUMENTS

| | | |
|---|---|---|
| 2003/0130985 A1* | 7/2003 | Driesen et al. .................... 707/1 |
| 2003/0135478 A1 | 7/2003 | Marshall et al. |
| 2004/0044997 A1 | 3/2004 | Talati et al. |
| 2005/0165802 A1 | 7/2005 | Sethi et al. |
| 2005/0251523 A1 | 11/2005 | Rajamani et al. |
| 2007/0027934 A1 | 2/2007 | Roehrle et al. |
| 2007/0180289 A1 | 8/2007 | Chai et al. |
| 2007/0220065 A1 | 9/2007 | Coyle et al. |
| 2007/0250542 A1 | 10/2007 | Chan et al. |
| 2008/0098037 A1* | 4/2008 | Neil et al. .................... 707/200 |
| 2008/0098046 A1* | 4/2008 | Alpern et al. ................ 707/203 |
| 2008/0115134 A1 | 5/2008 | Elliott et al. |
| 2008/0256528 A1 | 10/2008 | Waitzmann et al. |
| 2008/0294933 A1 | 11/2008 | Nishii et al. |
| 2009/0077563 A1 | 3/2009 | Thies et al. |
| 2009/0094236 A1 | 4/2009 | Renkes et al. |
| 2009/0113413 A1 | 4/2009 | Reinz |
| 2009/0172655 A1 | 7/2009 | Ivanov |
| 2009/0307277 A1 | 12/2009 | Grubov et al. |
| 2010/0088281 A1* | 4/2010 | Driesen et al. ................ 707/641 |
| 2010/0211548 A1 | 8/2010 | Ott et al. |
| 2010/0218196 A1 | 8/2010 | Leung et al. |
| 2010/0249980 A1 | 9/2010 | Ito |
| 2010/0318494 A1 | 12/2010 | Val et al. |
| 2011/0252426 A1 | 10/2011 | Antani et al. |
| 2012/0137297 A1 | 5/2012 | Hoprich |
| 2012/0166393 A1 | 6/2012 | Hoprich et al. |
| 2012/0166493 A1 | 6/2012 | Bentzien et al. |
| 2013/0159247 A1 | 6/2013 | Engelko et al. |
| 2013/0290259 A1 | 10/2013 | Hoprich et al. |

OTHER PUBLICATIONS

"Triggers", Oracle8iConcepts, Release 2 (8.1.6), Part No. A76965-01, 2000, 23 pages.
"Oracle Data Guard 11g Data Protection Availablity for Oracle Database", An Oracle Technical White Paper, Oct. 2011, 22 pages.
"Oracle Data Guard Concepts and Administration 11g Release 1 (11.1)", Part No. B28294-03Oracle, 2008, 2 pages.
Ray, et al, "Seamless Application Failover with Oracle Data Guard", Oracle, Dec. 2010, 67 pages.
"Oracle Beehive Administrator's Guide Release 1 (1.5)", Part No. E14836-04, Oracle, 2009, 8 pages.
"Oracle In-Memory Database Cache User's Guide 11g Release 2 (11.2.2)", Part No. E21634-05, Oracle, 2012, 5 pages.
"Openworld 2011—Day 3 Summary", Oracle Apps Blog, Oct. 26, 2011, 3 pages.
"Using Triggers", Oracle9i Application Developer's Guide—Fundamentals Release 2 (9.2), Part No. A96590-01, 2002, 43 pages.

* cited by examiner

INCREMENTAL CONVERSION OF DATABASE OBJECTS DURING UPGRADE OF AN ORIGINAL SYSTEM

TECHNICAL FIELD

This description relates to systems, methods, and apparatus for adjusting database objects while upgrading an original system.

BACKGROUND

Many known techniques for adjusting database objects within an original system can cause an undesirable level of downtime within the original system. For example, using many of these known techniques, all of the database objects of an original system may be unavailable to users while the database objects are being adjusted, and thus the upgrading of the system may necessarily be implemented during a downtime of the entire original system. The duration and impact of the downtime of the original system and/or unavailability of the database objects targeted for upgrade can be aggravated by computationally expensive and/or time consuming commands used to modify the database objects of the original system into an upgraded form. Thus, a need exists for systems, methods, and apparatus to address the shortfalls of present technology and to provide other new and innovative features.

SUMMARY

In one general aspect, a computer system can include instructions stored on a non-transitory computer-readable storage medium. The computer system can include a database comparator configured to identify a first database object from an original system for a complete modification based on a comparison of the first database object with a plurality of target upgrade database objects, and configured to identify a second database object from the original system for a partial modification based on a comparison of the second database object with the plurality of target upgrade database objects. The computer system can include a complete modification module configured to designate, in response to the identification of the first database object, the first database object for the complete modification based on an incremental conversion process. The computer system can include a modification instruction module configured to define an instruction to implement the partial modification. The computer system can also include a partial modification module configured to designate the second database object for the partial modification based on the incremental conversion process when the instruction to implement the partial modification satisfies at least a portion of a modification condition.

In another general aspect, a non-transitory computer-readable storage medium can store code representing instructions that when executed are configured to cause a processor to perform a process. The code can include code to identify a first database object from an original system for a complete modification based on a comparison of the first database object with a plurality of target upgrade database objects, and designate, in response to the identification of the first database object, the first database object for the complete modification based on an incremental conversion process. The code can include code to identify a second database object from the original system for a partial modification based on a comparison of the second database object with the plurality of target upgrade database objects, and define an instruction to implement the partial modification. The code can also include code to designate the second database object for the partial modification based on the incremental conversion process when the instruction to implement the partial modification satisfies at least a portion of a modification condition.

In yet another general aspect, a method can include executing instructions recorded on a non-transitory computer-readable storage media using at least one processor. The method can include identifying a first database object from an original system for a complete modification based on a comparison of the first database object with a plurality of target upgrade database objects, and designating, in response to the identification of the first database object, the first database object for the complete modification based on an incremental conversion process. The method can include identifying a second database object from the original system for a partial modification based on a comparison of the second database object with the plurality of target upgrade database objects, and defining an instruction to implement the partial modification. The method can also include designating the second database object for the partial modification based on the incremental conversion process when the instruction to implement the partial modification satisfies at least a portion of a modification condition.

The details of one or more implementations are set forth in the accompanying drawings and the description below. Other features will be apparent from the description and drawings, and from the claims.

DETAILED DESCRIPTION

Figure 1:
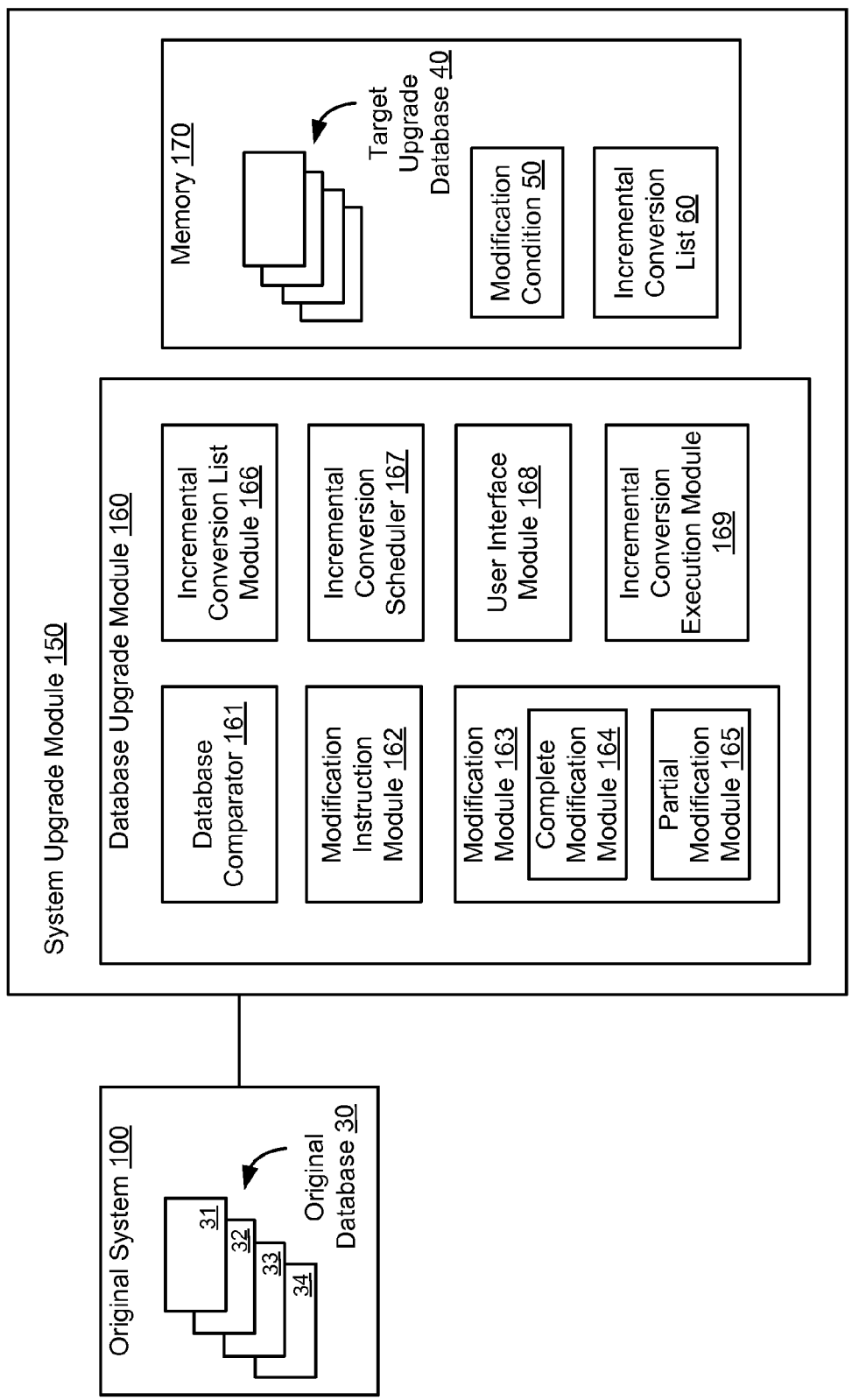
FIG. 1 is a block diagram that illustrates a system upgrade module configured to execute at least a portion of an upgrade of an original system.

FIG. 1 is a block diagram that illustrates a system upgrade module 150 configured to execute at least a portion of an upgrade of an original system 100. Specifically, the system upgrade module 150 includes a database upgrade module 160 configured to facilitate upgrade of original database 30 of the original system 100 to an upgraded version (e.g., an upgraded state, a target state). In some embodiments, the original system 100, including the original database 30, can be upgraded to a target version of the system (also can be referred to as a target system). In some embodiments, portions of the original system 100, such as one or more database objects of the original database 30, can be modified during an uptime of the original system 100 (e.g., during an incremental conversion process) and/or during a downtime of the original system 100. As shown in FIG. 1, the original database 30 includes original database objects 31 through 34. In some embodiments, one or more of the objects of the original database 30 can be, for example, a table.

In some embodiments, the original system 100 can be a stand-alone device and/or module, a server, a network, a data center, a software and/or hardware system, a virtual system, a system defined based on Advanced Business Application Programming (ABAP), and/or so forth. During a downtime of the original system 100, the original system 100 can be referred to as being in a down state, and during an uptime of the original system 100, the original system 100 can be referred to as being in an up state.

The upgrade of the original system 100 can include modifying (or not modifying) the structure and/or data of one or more database objects of the original database 30 so that the structure and/or data of the database objects of the original database 30 matches the structure and/or data of at least one target upgrade database objects from target upgrade database 40 stored in a memory 170 of the system upgrade module 150. In other words, the upgrade of the original system includes modifying the original database 30 (or objects thereof) so that original database 30 have the same form (i.e., structure) and/or substance (i.e., data) of the target upgrade database 40 (or objects thereof). The target upgrade database 40 represents the target upgrade structure and/or target upgrade data of the original database 30. In some embodiments, the original database 30 can represent more than one original database, and the target upgrade database 40 can represent more than one target upgrade database.

The structure of a database or an object of a database (such as one of the original database objects from the original database 30) can be defined by rows and/or columns. The data stored in a database (or object thereof) can be divided into fields by the structure of the database. For example, a field of a database can be at an intersection of a row of the database and a column of the database, and can include a portion of data. In some embodiments, the database can be, for example, an Oracle database, a DB2 database, and/or so forth.

In some embodiments, the original database 30 can be a program database and/or a user database. For example, original database object 31 can be an object of a program database associated with an executable program (e.g., an executable file) of the original system 100 (e.g., an operating system of the original system 100), and original database object 33 can be an object of a user database including data defined by a user of the original system 100. In some embodiments, a program database can include, for example, configuration data associated with one or more of the executable files. In some embodiments, the user data included in a user database can include, or can be, business data, financial data, human resources data, and/or so forth.

The database upgrade module 160 includes a database comparator 161 configured to identify a modification type of each of the objects of the original database 30 during upgrade of the original system of the original database 30 based on a comparison of each of the objects of the original database 30 with a target upgrade database object from the target upgrade database 40. Specifically, the database comparator 161 can be configured to identify a modification type for each of the objects of the original database 30 based on a comparison of a structure and/or a data of each of the objects of the original database 30 with a structure and/or a data of a target upgrade database object from the target upgrade database 40.

The modification type identified by the database comparator 161 can be, for example, a complete modification, a partial modification, or no modification. In some embodiments, a complete modification can be referred to as a complete conversion, a partial modification can be referred to as a partial conversion, and no modification can be referred to as no conversion.

During a partial modification (that is not performed during incremental conversion), only a portion of the fields from the database object are modified, or otherwise affected during the upgrade. In other words, only a portion of the structure of the database object or a portion of the data included within the database object is modified during a partial modification. For example, only a subset of the rows of the database object (and/or the data included therein) and/or a subset of the columns (and/or the data included therein) of the database object are modified during a partial modification.

During a complete modification, all of the fields from the database object are modified, or otherwise affected during the upgrade. In other words, the entire structure of the database object and/or all of the data from the database object is modified during a complete modification. For example, all of the rows of the database object (and/or the data included therein) and all of the columns (and/or the data included therein) of the database object are modified during a complete modification. In some embodiments, a complete modification of a database object can be referred to as a conversion of the database object or as a database object conversion.

No modification is contrasted with a complete modification and a partial modification. None of the fields of a database (e.g., database object) are modified when the database has been identified for no modification. Database objects that are not modified are already in a state that is acceptable for use in an upgraded system.

The modification instruction module 162 of the database upgrade module 160 can be configured to define a modification instruction that can be used to implement a modification type of one or more of the objects of the original database 30. In other words, a modification of one or more of the original database 30 into an upgraded version of the one or more of the objects of the original database 30 can be implemented (e.g., accomplished) based on one or more modification instructions defined by the modification instruction module 162. The modification instruction can be, or can include, one or more database statements (which can also be referred to as database instructions). A modification instruction can be defined using one or more programming languages such as a structured query language (SQL), a data definition language (DDL), Java, C++, and/or so forth, and/or using one or more development programming tools.

For example, if original database object 31 from the original database 30 is identified for complete modification by the database comparator 161 based on a comparison of the original database object 31 with a target upgrade database object from the target upgrade database 40, the modification instruction module 162 can be configured to define a modification instruction to implement the complete modification of the original database object 31 from the original database 30. The complete modification can include, for example, rotating the entire structure of the original database object 31 so that all of the fields of the original database object 31 are modified during the complete modification. In such instances, the modification instruction to implement the complete modification can include multiple database statements (or multiple single-line database statements). In other words, the modification instruction to implement the complete modification can be a relatively complex instruction.

As another example, if original database object 32 from the original database 30 is identified for partial modification by the database comparator 161 based on a comparison of the original database object 31 with a target upgrade database object from the target upgrade database 40, the modification instruction module 162 can be configured to define a modification instruction to implement the partial modification of the original database object 32 from the original database 30. The partial modification can include, for example, inserting a column (with or without data) into the structure of the original database object 32 so that only a portion of the fields of the original database object 32 are modified during the partial modification. In such instances, the modification instruction to implement a partial modification can include a single database statement. An example, of a single database statement (or a single-line database statement) implementing a partial modification in SQL is "alter table add field" or "create index".

After an original database object from the original database 30 has been identified for a type of modification, the modification module 163 of the database upgrade module 160 can be configured to designate the original database object from original database 30 for modification based on an incremental conversion process. The designation for incremental conversion can be determined by the modification module 163 based on a modification condition 50.

For example, one or more of the objects of the original database 30 may be designated for modification based on an incremental conversion process when the modification condition 50 is satisfied. Objects of the original database 30 that have been designated for modification based on an incremental conversion process can be referred to as designated database objects. Designation for modification based on an incremental conversion process can also be referred to as designation for incremental conversion.

In some embodiments, the modification condition 50 can include more than one modification condition (i.e., can include multiple conditions). In some embodiments, the modification condition 50 can be based on a modification type and/or a modification instruction associated with the modification type. For example, the modification condition 50 may be satisfied when a modification instruction includes a particular type of instruction (e.g., an "alter table add field" instruction, a "create index" instruction).

In some embodiments, the modification condition 50 can be based on a size filter. For example, one or more of the objects of the original database 30 may be designated for modification, or no longer designated for modification, based on an incremental conversion process when the one or more objects of the original database 30 is larger (or smaller) than a particular size (e.g., a threshold size, a bit size, a number of fields, a number of columns and/or rows).

In some embodiments, one or more of the objects of the original database 30 may be designated for modification, or no longer designated for modification, based on an incremental conversion process when the one or more objects of the original database 30 is scheduled for modification based on another process (e.g., another modification technique) different from the incremental conversion process. In some embodiments, the designation of modification based on an incremental conversion process can take priority over modification based on a process different than the incremental conversion process.

During an incremental conversion process, a database object (such as one or more of the objects of the original database 30) can be upgraded in a piecemeal fashion during an uptime of the original system 100 so that operation of the original system 100 may not be disrupted (e.g., may not be substantially disrupted) during the upgrade. In other words, the incremental conversion process can be performed during productive operation (e.g., performed in a productive environment) of the original system 100, so that users may continue to access (e.g., use) the original system 100 during the incremental conversion process.

In some embodiments, a portion of the incremental conversion process may be performed during a downtime of the original system 100. For example, a structure and/or data of a database (or object thereof) may be completely (or nearly completely) modified based on an incremental conversion process during an uptime of the original system 100. Final copying of the completely (or nearly completely) modified database (or object thereof) into the original system 100 can be performed based on a final portion of the incremental conversion process during a downtime of the original system 100.

In some embodiments, the incremental conversion process can be performed in conjunction with a shadow system (not shown). The shadow system can be a temporary system created for use during an upgrade of the original system 100. For example, a portion of original database object 32 of the original system 100 can be transferred into an upgraded version of the original database object 32 functioning in a shadow system. The upgraded version of the original database object 32 can be an empty shell that has a structure of at least one of objects of the target upgrade database 40, and the data from the original database object 32 can be moved into the structure in the shadow system. After the structure in the shadow system has been populated with the data from the original database object 32, the structure and data of the shadow system can replace the original database object 32 in the original system 100 as an upgraded database object. In some embodiments, the incremental conversion process can be performed using any type of programming language such as a database language, a DDL statement, an SQL instruction, and/or so forth. More details related to incremental conversion are described in connection with FIG. 3.

As shown in FIG. 1, the modification module 163 includes a complete modification module 164. The complete modification module 164 is configured to handle designation of one or more of the objects of the original database 30 for incremental conversion after (or when) the object(s) of the original database 30 have been identified for complete modification. The partial modification module 165 is configured to handle designation of one or more of the objects of the original database 30 for incremental conversion after (or when) the object(s) of the original database 30 have been identified for partial modification.

In some embodiments, an object of the original database 30 that has been identified for complete modification can be designated, by default, by the complete modification module 164 for implementation of the complete modification based on the incremental conversion process. In some embodiments, each of the objects of the original database 30 that have been identified for complete modification may be designated for implementation of the complete modification using the incremental conversion process based on an assumption that all (or a relatively large portion of) the complete modification should be performed during an uptime of the original system 100. If not performed based on the incremental conversion process during an uptime of the original system 100 the complete modification could instead be performed during a downtime of the original system 100 (without using the incremental conversion process). Accordingly, the complete modification of one or more of the objects of the original database 30 may increase a downtime of the original system 100 in an undesirable fashion.

In some embodiments, only a portion (rather than all) of the objects of the original database 30 that have been identified for complete modification can be designated by the complete modification module 164 for incremental conversion. Only the object of the original database 30 may be designated by the complete modification module 164 for incremental conversion process based on a predicted duration of the complete modification and/or based on a modification instruction. For example, original database object 34 from the original database 30 can be identified for complete modification by the database comparator 161. The modification instruction module 162 can be configured to define a modification instruction that can be used to implement (e.g., perform) the complete modification. The complete modification module 164 can be configured to predict (based on a simulation and/or based on a database size) whether or not the complete modification of the original database object 34 will take longer than a specified period of time. If the implementation of the complete modification will take longer than the specified period of time, the complete modification module 164 can be configured to designate that implementation of the complete modification of the original database object 34 should (or should not) occur based on an incremental conversion process. In some embodiments, the complete modification module 164 can be configured to designate that implementation of the complete modification of the original database object 34 should occur based on an incremental conversion process in response to the modification instruction associated with the original database object 34 including, for example, a particular instruction (e.g., command, a particular multi-line database modification instruction).

In some embodiments, all, or a portion, of the original database 30 that have been identified for partial modification can be designated, by default, by the partial modification module 165 for implementation of the partial modification based on the incremental conversion process. In some embodiments, only a portion (e.g., an object) of the original database 30 may be designated by the partial modification module 165 for implementation of the partial modification using the incremental conversion process based on a predicted duration of the partial modification and/or based on a modification instruction. For example, original database object 33 from the original database 30 can be identified for partial modification by the database comparator 161. The modification instruction module 162 can be configured to define a modification instruction that can be used to implement (e.g., perform) the partial modification. The partial modification module 165 can be configured to designate that implementation of the partial modification of the original database object 33 should occur based on an incremental conversion process in response to the modification instruction associated with the original database object 33 including a single database statement and/or a particular command such as an "alter table add field" instruction or a "create index" instruction. In some embodiments, the partial modification module 165 can be configured to predict whether or not the partial modification of the original database object 33 will take longer than a specified period of time (determined based on a simulation and/or based on a database size). If the implementation of the partial modification of will take longer than the specified period of time, the partial modification module 165 can be configured to designate that implementation of the partial modification of the original database object 33 should (or should not) be performed based on an incremental conversion process.

An incremental conversion list module 166 of the database upgrade module 160 can be configured to define an incremental conversion list 60 that includes the objects of the original database 30 that have been designated for incremental conversion. The incremental conversion list 60 defined by the incremental conversion list module 166 can be automatically defined based on the objects of the original database 30 identified by the modification module 163 (e.g., the complete modification module 164 of the modification module 163 and/or the partial modification module 165 of the modification module 163) for modification (e.g., complete modification, partial modification) based on an incremental conversion process. In other words, the incremental conversion list 60 may be populated with objects of (e.g., identifiers of objects of) the original database 30 that have been automatically designated for incremental conversion by the modification module 163.

The incremental conversion list 60 can be used by an incremental conversion execution module 169 to perform an incremental conversion process. Specifically, objects of the original database 30 that have been designated for incremental conversion and appear on (i.e., have identifiers that appear on) the increment of conversion list 60 may be modified based on an incremental conversion process. Objects of the original database 30 that do not appear on the incremental conversion list 60 may not be modified based on the incremental conversion process.

In some embodiments, if the incremental conversion list 60 includes objects of the original database 30 (e.g., identifiers of objects of the original database 30) designated for partial modification based on an incremental conversion process, the incremental conversion list 60 can be referred to as an extended incremental conversion list. The incremental conversion list 60 can be referred to as an extended incremental conversion list because the incremental conversion list 60 is extended to include objects of the original database 30 designated for partial modification rather than just objects designated for complete modification.

In some embodiments, the system upgrade module 150 can be configured so that a user (not shown), or another process/module (not shown) may modify (e.g., manually modify, automatically modify), or confirm, entries in the incremental conversion list 60 via a user interface module 168. For example, after the incremental conversion list 60 has been defined by the incremental conversion list module 166, the incremental conversion list 60 can be presented to a user via the user interface module 168. The incremental conversion list 60 can be presented in a way that the user can confirm or remove entries (e.g., identifiers) associated with one or more of the objects of the original database 30 that have been designated for modification based on an incremental conversion process. Because the incremental conversion list 60 may be modified by a user, or some other process, in some embodiments, the incremental conversion list 60 can be referred to as a candidate incremental conversion list that includes database objects that are candidates for modification based on an incremental conversion process. In some embodiments, the objects of the original database 30 included in the incremental conversion list 60 as being designated for incremental conversion can be referred to as candidate database objects.

For example, the incremental conversion list 60 can include an identifier of a first original database object (from the original database 30) and an identifier of a second original database object (from the original database 30) that have been designated for modification (e.g., partial modification or complete modification) based on the incremental conversion process. The user can, via the user interface module 168, confirm that the first original database object from the original database 30 should be modified based on the incremental conversion process by selecting (or confirming designation of) the identifier of the first original database object included in the incremental conversion list 60. The user can also, via the user interface module 168, indicate that the second original database object from the original database 30 should not be modified based on the incremental conversion process by deselecting (or removing) the identifier of the second original database object from the incremental conversion list 60. A final version of an incremental conversion list, which may be defined after being modified by, for example, a user can be referred to as a final incremental conversion list.

In some embodiments, one or more of the objects of the original database 30 may be designated for incremental conversion and added to the incremental conversion list 60 based on one or more of the modification conditions 50 being satisfied. One or more of the objects of the original database 30 may later be removed from the incremental conversion list 60 based on one or more of the modification conditions 50 being satisfied, or unsatisfied at a later time. For example, original database object 32 from the original database 30 maybe designated for and added to the increment conversion list 60. The original database object 32 may later be removed from the incremental conversion list 60 in response to the original database object 32 being designated for modification based on another process other than the incremental conversion process.

Although the term incremental conversion list is used to describe, or represents, a collection of database objects that have been designated for modification based on an incremental conversion process, the incremental conversion list may not be presented to a user as an actual list. In some embodiments, the original database objects from the original database 30 that have been designated for incremental conversion and included in the incremental conversion list 60 may be presented to a user as interconnected nodes in a visual tree structure. For example, the relationships between each of the objects of the original database 30 may be represented by lines between the objects of the original database 30 within a nodal map where each of the original databases is represented as a node. Each of the original database objects from the original database 30 that has been designated for incremental conversion may be highlighted (or otherwise noted) within the nodal map. In some embodiments, a user may select one or more of the designated original database objects for inclusion in a final incremental conversion list via the nodal map.

In some embodiments, a user may designate one or more of the objects of the original database 30 for modification based on an incremental conversion process by adding an identifier of the one or more original database objects from the original database 30 in the incremental conversion list 60. In other words, a user may manually edit the incremental conversion list 60 that includes identifiers of one or more objects of the original database 30 designated for incremental conversion. In some embodiments, a user may manually designate one or more of the objects of the original database 30 for modification based on an incremental conversion process even though none of the objects of the original database 30 may be automatically designated for modification based on incremental conversion process by the modification module 163.

In some embodiments, designation of one or more of the objects of the original database 30 for modification based on an incremental conversion process (which can include designated databases included in the incremental conversion list 60) may be modified based on one or more user preferences (not shown). A user preference can indicate that only a portion of designated databases (or objects thereof) may be modified based on an incremental conversion process and that the remaining portion of the designated databases (or objects thereof) should not be modified based on the incremental conversion process. A user preference can indicate that only designated databases (or objects thereof) with a specified type of content, a specified owner, of a specified size, and/or so forth, should be modified based on the incremental conversion process.

In some embodiments, a modification instruction defined by the modification instruction module 162 can be implemented based on an incremental conversion process by the incremental conversion execution module 169. Specifically, the incremental conversion execution module 169 can be configured to receive one or more modification instructions associated with one or more of the objects of the original database 30 that have been designated for modification (e.g., a complete modification, a partial modification) based on an incremental conversion process. The incremental conversion execution module 169 can be configured to then use the one or more modification instructions to perform the modification of the one or more objects of the original database 30 based on the incremental conversion process. In some embodiments, the incremental conversion execution module 169 may be configured to trigger the modification based on an incremental conversion process only for objects of the original database 30 identified within the incremental conversion list 60 (defined at least in part) by the incremental conversion list module 166 and/or modified by a user).

In some embodiments, one or more of the objects of the original database 30 that have been designated for modification (e.g., a complete modification, a partial modification) based on an incremental conversion process can be scheduled for modification based on the incremental conversion process by an incremental conversion scheduler 167. Specifically, the incremental conversion scheduler 167 can be configured to receive an indicator that one or more of the objects of the original database 30 have been designated for incremental conversion. The incremental conversion scheduler 167 can be configured to schedule the one or more objects of the original database 30 for incremental conversion starting at a specified time, ending at a specified time, or during a specified time period.

In some embodiments, the incremental conversion scheduler 167 can be configured to schedule modification of one or more of the objects of the original database 30 based on an incremental conversion process randomly, in a specified order, in a periodic fashion, and/or so forth. In some embodiments, the order can be defined based on a predicted duration of a modification of one or more of the objects of the original database 30. For example, a first original database object from the original database 30 may be scheduled for modification based on an incremental conversion process before (or after) modification of a second original database object from the original database 30 is scheduled for incremental conversion because the modification of the first original database object is predicted to be completed during a time period shorter than the modification of the second original database object. In some embodiments, the incremental conversion scheduler 167 may schedule modification of one or more of the objects of the original database 30 based on the incremental conversion process only if the one or more objects of the original database 30 are included in (e.g., appear in) the incremental conversion list 60 (defined by the incremental conversion module 166 and/or modified by a user).

In some embodiments, the incremental conversion execution module 169 can be configured to perform the modification of one or more of the objects of the original database 30 in accordance with a schedule defined by the incremental conversion scheduler 167. In some embodiments, the incremental conversion execution module 169 may be configured to perform modification of one or more of the objects of the original database 30 in an order defined within the incremental conversion list 60.

In some embodiments, several database objects from the original database 30 may be modified based on an incremental conversion process in parallel. For example, original database object 33 from the original database 30 may be modified based on an incremental conversion process in parallel with original database object 34 from the original database 30, which may also be modified based on incremental conversion process. In some embodiments, several original database objects from the original database 30 may be modified in a serial fashion. For example, a first original database object from the original database 30 may be modified based on an incremental conversion process only after modification of a second original database object from the original database 30 based on the incremental conversion process has been completed.

The system upgrade module 150 can be, or can be included within, for example, a client device and/or a server device. In some embodiments, the system upgrade module 150 can be, or can be included within, for example, a wired device and/or a wireless device (e.g., wi-fi enabled device) and can be, for example, a computing entity (e.g., a personal computing device), a mobile phone, a personal digital assistant (PDA) and/or so forth. The system upgrade module 150 can be configured to operate based on one or more platforms (e.g., one or more similar or different platforms) that can include one or more types of hardware, software, firmware, operating systems, runtime libraries, and/or so forth. In some embodiments, the system upgrade module 150 can be defined using ABAP and/or can be related to a NetWeaver platform.

Although not shown, in some embodiments, the memory 170 can be implemented as more than one memory component (e.g., more than one random-access memory (RAM) component or disk drive memory) within the system upgrade module 150. In some embodiments, the memory 170 can be, or can include, a non-local memory (e.g., a memory not physically included within the system upgrade module 150) within a network (not shown). For example, the memory 170 can be, or can include, a memory shared by multiple system upgrade modules (not shown) within a network.

Although not shown, the system upgrade module 150 can be configured to operate within an environment that includes an operating system. In some embodiments, the operating system can be configured to facilitate the functions of the database upgrade module 160 and memory 170.

In some embodiments, the system upgrade module 150 can represent, or can be included within, a cluster of modules/devices. In such an embodiment, the functionality and processing of the system upgrade module 150 (e.g., the database upgrade module 160 of the system upgrade module 150) can be distributed to several modules/devices of the cluster of modules/devices.

In some embodiments, one or more portions of the components shown in the system upgrade module 150 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the database upgrade module 160 can be, or can include, a software module configured for execution by at least one processor (not shown). In some embodiments, the functionality of the components can be included in different modules and/or components than those shown in FIG. 1. For example, although not shown, the functionality of the database comparator 161 can be included in a different module than the database comparator 161, or divided into several different modules.

In some embodiments, the system upgrade module 150 can be included within a network that can include multiple devices (e.g., multiple client devices, multiple server devices). For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet. Also, although not shown in FIG. 1, the system upgrade module 150 can be configured to function within various types of network environments.

Figure 2:
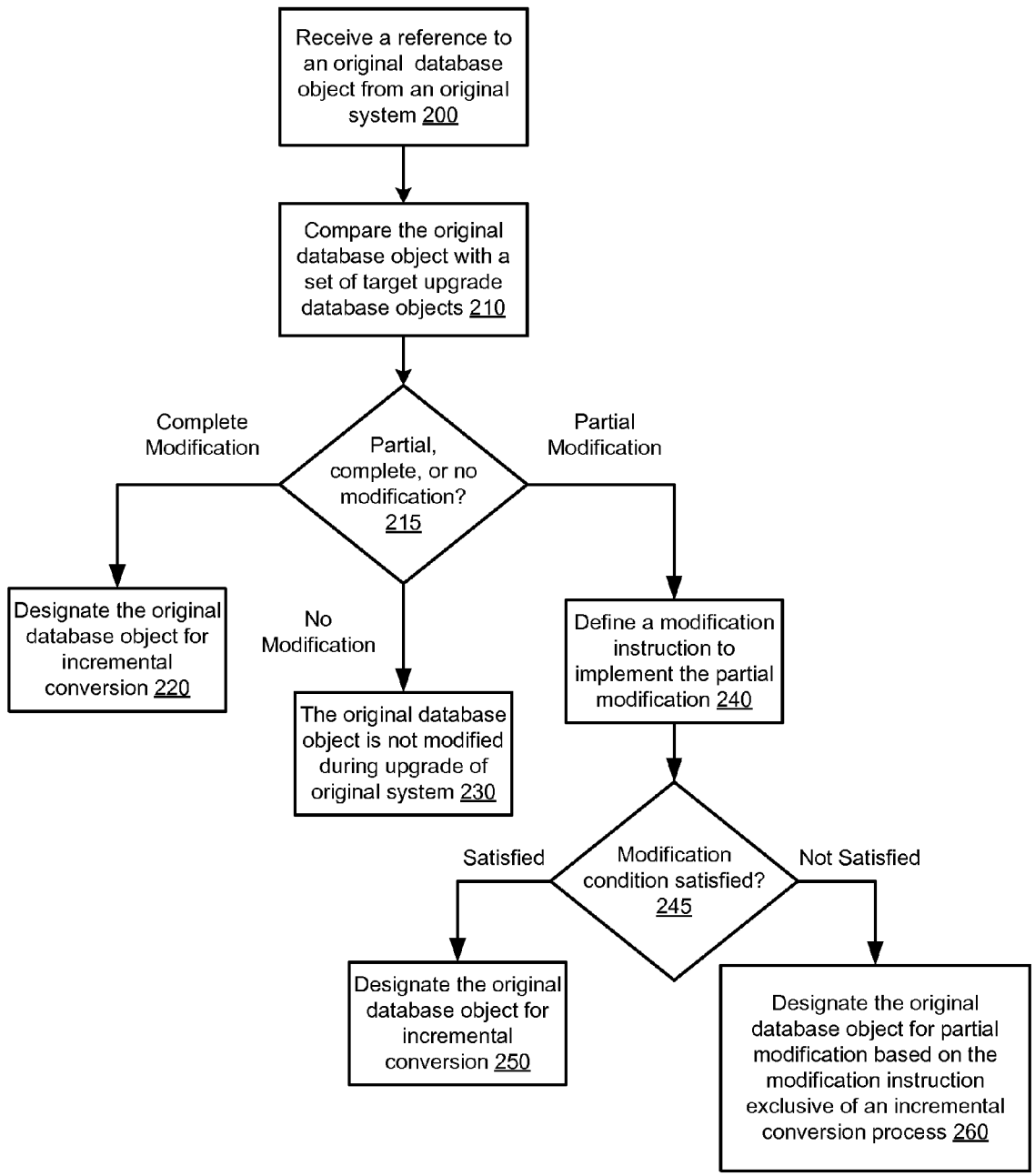
FIG. 2 is a flowchart that illustrates a method for designating an original database object for modification based on an incremental conversion process.

FIG. 2 is a flowchart that illustrates a method for designating an original database object for modification based on an incremental conversion process. As shown in FIG. 2, a reference to an original database object is received from an original system (block 200). In some embodiments, the original system can be a stand-alone device and/or module, a server, a network, a data center, a software and/or hardware system, a virtual system, and/or so forth. The original system can be a system targeted for an upgrade to a target version of a system. Accordingly, the original database object may also be upgraded when the original system is upgraded.

The original database object is compared with a set of target upgrade database objects (block 210). The original database object can be compared with a target upgrade database object from the set of target upgrade database objects that corresponds with the original database object. The set of target upgrade database objects can be stored in a memory where they can be accessed by a system upgrade module such as the system upgrade module 150 shown in FIG. 1. The comparison can be performed by, for example, a database comparator such as the database comparator 161 shown in FIG. 1.

As shown in FIG. 2, the original database object can be identified (block 215) as being a database object subject to complete modification, partial modification, or no modification. If the original database object is not subject to modification (block 215), the original database object is not modified during the upgrade of the original system (block 230). In some embodiments, the original database object can be copied to an upgraded version of the original system without modification.

If the original database object is subject to complete modification (block 215), the original database object is designated for incremental conversion (block 220). In some embodiments, the original database object can be designated for incremental conversion by a complete modification module such as complete modification module 164 included in modification module 163 shown in FIG. 1. The modification of the original database object can be classified as a complete modification because all of the fields of the original database object are to be modified during an upgrade of the original system.

Although not shown in FIG. 2, in some embodiments, one or more modification instruction that can be used to implement the complete modification of the original database object can be defined by a modification instruction module such as modification instruction module 162 shown in FIG. 1. Although not shown in FIG. 2, if the original database object is subject to complete modification, an identifier of the original database object can be included in an incremental conversion list.

If the original database object is subject to partial modification (block 215), a modification instruction to implement the partial modification is defined (block 240). In some embodiments, the modification instruction can be defined by a modification instruction module such as modification instruction module 162 shown in FIG. 1. The modification of the original database object can be classified as a partial modification because only a portion of the original database object is to be modified during an upgrade of the original system.

As shown in FIG. 2, if a modification condition is satisfied (block 245), the original database object is designated for incremental conversion (block 250). The modification condition can be satisfied based on, for example, the modification instruction including a particular type of instruction. In some embodiments, the modification condition may also be satisfied if the original database object is smaller, or larger, than a specified size (e.g., a threshold size). Accordingly, if the original database object is smaller, or larger, than a specified size, modification condition may not be satisfied. In some embodiments, the modification condition may also be satisfied if the original database object is not subject to modification based on a processing technique different than (and/or that takes precedence over) the incremental conversion process. Accordingly, if the original database object is subject to modification based on a processing technique different than (and/or that takes precedence over) the incremental conversion process, the modification condition may not be satisfied. When a partial modification is performed using the incremental conversion process, all of the fields of the original database object will be affected. In other words, the partial modification will be performed in a fashion that is similar to a complete modification.

If the modification condition is not satisfied (block 245), the original database object may not be designated for incremental conversion. Instead, the original database object may be designated for partial modification based on a modification instruction exclusive of an incremental conversion process (block 260). In some embodiments, the incremental conversion process (or a relatively large portion of the incremental conversion process) can be performed during an uptime of the original system. In some embodiments, the partial modification (or a portion thereof) of the original database object may be performed during a larger portion of an uptime of the original system using an incremental conversion process than if the partial modification of the original database object were performed exclusive of the incremental conversion process (i.e., using a different process). In some embodiments, a determination as to whether or not a modification condition has been satisfied can be performed by a partial modification module such as partial modification module 165 shown in FIG. 1.

Figure 3:
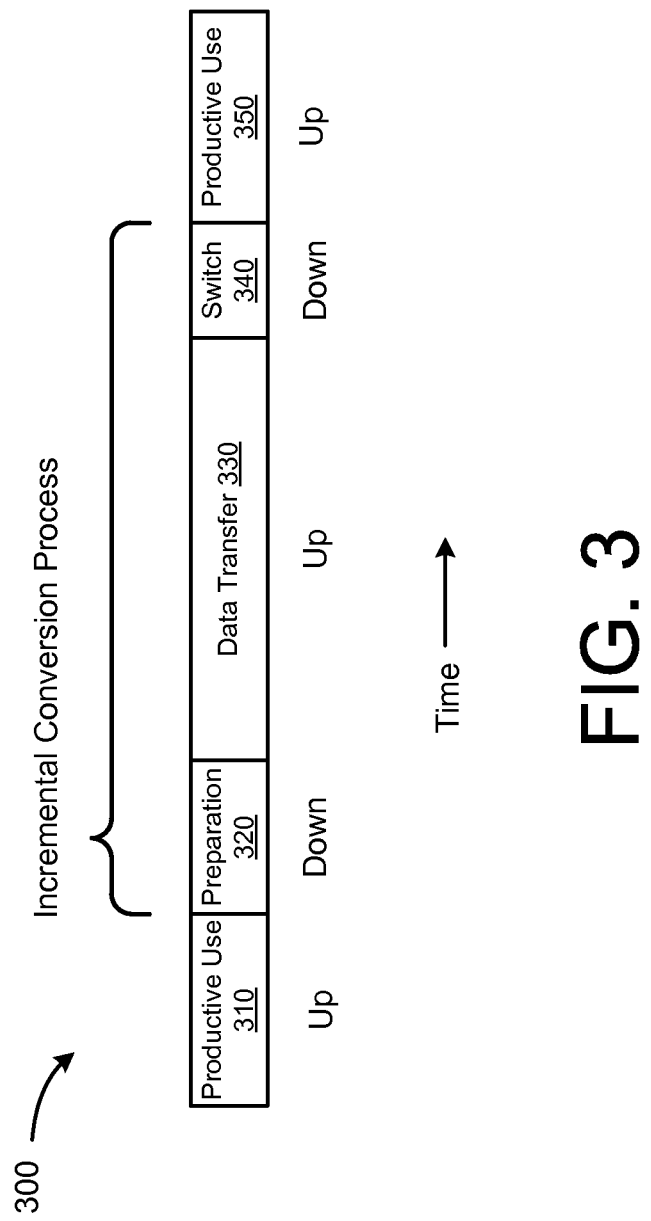
FIG. 3 is a diagram that illustrates a timeline of uptime of an original system during a system upgrade using an incremental conversion process.

FIG. 3 is a diagram that illustrates a timeline 300 of uptime of an original system during a system upgrade using an incremental conversion process. The timeline 300 includes a productive use time period 310, a preparation time period 320, a data transfer time period 330, a switch time period 340, and a productive use time period 350. As shown in FIG. 3, time increases to the right. At least some portions of the conversion process can be performed by an incremental conversion execution module such as incremental conversion execution module 169 shown in FIG. 1.

The productive use time period 310 and the productive use time period 350 are time periods during which an original system is operating in an uptime operating mode as indicated by the designation "Up" below each of these time periods. During the productive use time period 310 and the productive use time period 350 the original system is not being upgraded and is operating in a typical operating mode.

As shown in FIG. 3, the incremental conversion process includes at least three different time periods—the preparation time period 320, the data transfer time period 330, and the switch time period 340. During the preparation time period 320, one or more original database objects of the original system are prepared for modification (e.g., partial modification, complete modification). The preparation for modification is performed during a downtime of the original system as designated by "Down" below the preparation time period 320.

After the preparation time period 320 has completed, the original system is changed from a down state to an up state. During the data transfer time period 330, transfer of data from one or more original database objects of the original system are performed. As the original system is in an up state now, data transfer can be supported by techniques to keep track of data changes using, for example, database triggers and/or conversion flags in place during the incremental conversion process. In other words, modification of the original database objects is performed during the data transfer time period 330. In some embodiments, the transfer of data can be between the original database object(s) and a shadow database object(s), which is an upgraded version of the original database object (s) in a shadow environment. During the data transfer time period 330, the original system is operating in a typical operating mode.

After the data transfer time period 330 has been completed, the original database object(s) is replaced with an upgraded version of the original database object(s) during the switch time period 340. During the switch time period 340, the original system is in a down state as designated by "Down" below the switch time period 340.

Although not shown in FIG. 3, if one or more of the original database objects is modified based on a process different than the incremental conversion process shown in FIG. 3 (i.e., a different database object modification/upgrade technique), the original system may be in a down state during the entire data transfer time period 330, or during a relatively significant portion of the data transfer time period 330. Accordingly, modification of the original database object(s) based on the different process will require a significantly longer downtime than using the incremental conversion process shown in FIG. 3.

Figure 4:
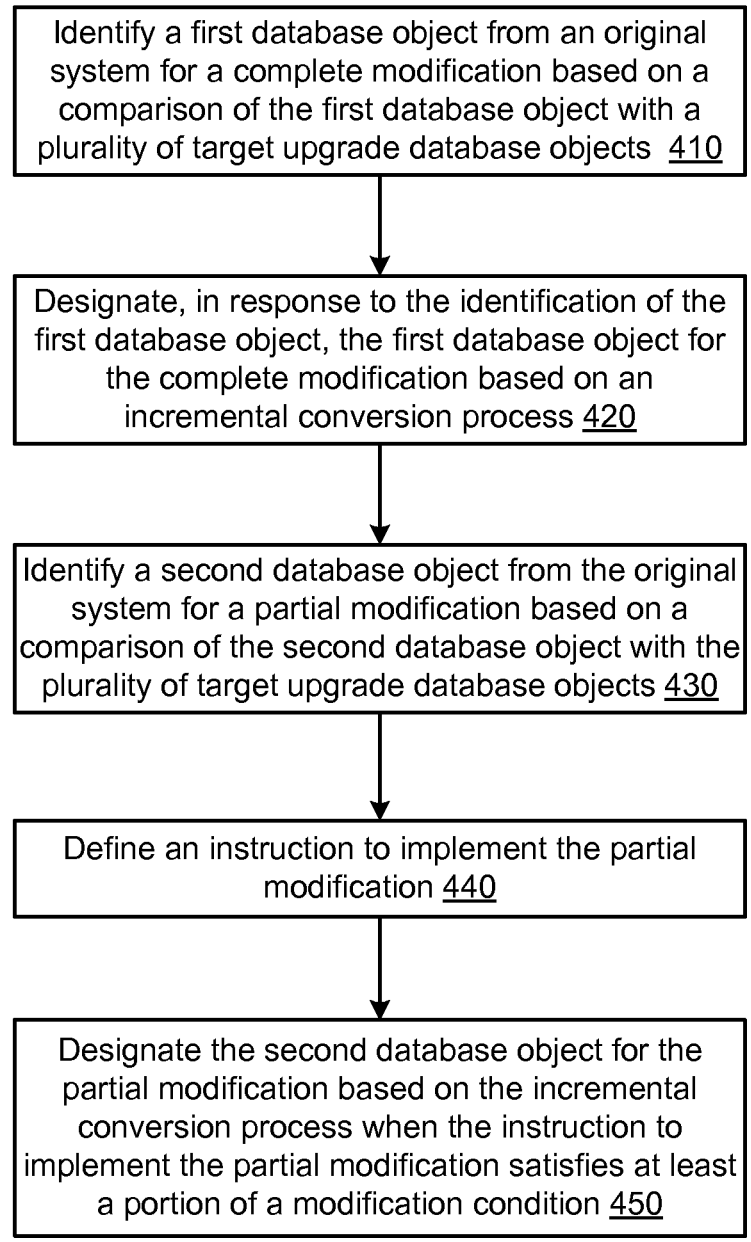
FIG. 4 is a flowchart that illustrates a method for determining whether a database object from an original system should be designated for incremental conversion.

FIG. 4 is a flowchart that illustrates a method for determining whether a database object from an original system should be designated for incremental conversion. The method shown in FIG. 4 may be performed by one or more of the components included in a system upgrade module such as system upgrade module 150 shown in FIG. 1.

As shown in FIG. 4, a first database object from an original system is identified for a complete modification based on a comparison of the first database object with a plurality of target upgrade database objects (block 410). The plurality of target upgrade database objects may be stored in a memory that can be accessed by a database upgrade module such as database upgrade module 160 shown in FIG. 1.

In response to the identification of the first database object, the first database object is designated for the complete modification based on an incremental conversion process (block 420). In some embodiments, the modification of the first database object may be characterized as a complete modification because all of the fields of the first database object may be subject to modification during upgrade of the original system. Specifically, all of the fields in the first database object may be subject to modification in order for the first database object to correspond with the structure and/or data of at least one target database object from the plurality of target upgrade database objects. In some embodiments, the first database object may be designated for incremental conversion by a complete modification module such as complete modification module 164 shown in FIG. 1. In some embodiments, the first database object may be designated, by default, for incremental conversion because the first database object is to be completely modified.

A second database object from the original system is identified for a partial modification based on a comparison of the second database object with the plurality of target upgrade database objects (block 430). In some embodiments, the modification of the second database object may be characterized as a partial modification because only a portion of the fields of the second database object may be subject to modification during upgrade of the original system. Specifically, only a portion of the fields in the second database object may be subject to modification in order for the second database object to correspond with the structure and/or data of at least one target database object from the plurality of target upgrade database objects.

As shown in FIG. 4, an instruction is defined to implement the partial modification (block 440). In some embodiments, the instruction can be defined by (e.g., automatically defined by) a modification instruction module such as modification instruction module 162 shown in FIG. 1. In some embodiments, the instruction can be referred to as a modification instruction. In some embodiments the instruction can be implemented by an incremental conversion execution module such as incremental conversion execution module 169 shown in FIG. 1.

The second database object is designated for the partial modification based on the incremental conversion process when the instruction to implement the partial modification satisfies at least a portion of a modification condition (block 450). For example, the instruction can include a particular type of instruction. In some embodiments, the modification condition can be satisfied when the instruction is a single database statement. In some embodiments, modification can be satisfied when the instruction is, for example, an index creation instruction, a column creation instruction, an add field instruction, and/or so forth.

Although not shown in FIG. 4, one or more database objects from the original system may be excluded from designation for incremental conversion when the modification condition is not satisfied. In some embodiments, for example, a database object may be excluded from designation for incremental conversion when a predicted time period for modification of the database object does not exceed a specified time period. The predicted time period can be determined based on a simulation of a modification of the database object.

Figure 5:
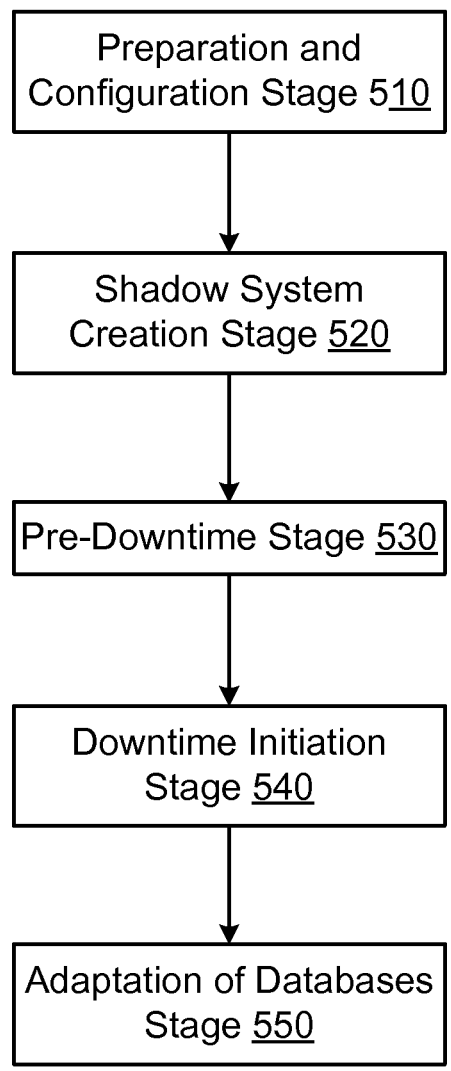
FIG. 5 is a flowchart that illustrates stages during an upgrade of an original system.

FIG. 5 is a flowchart that illustrates stages during an upgrade of an original system. In some embodiments, at least a portion of the flowchart shown in FIG. 5 can be performed by a database upgrade module such as database upgrade module 160 shown in FIG. 1.

During a preparation and configuration stage (block 510), a database upgrade module can be configured to determine whether or not database objects may be designated for partial modification based on an incremental conversion process at all. In other words, the database upgrade module can be configured to activate or deactivate the complete or partial modification modules shown in FIG. 1. In some embodiments, a database upgrade module can be configured to determine whether or not an extended incremental conversion list may be defined. In some embodiments, functionality related to an extended incremental conversion list may be activated by, for example, an administrator.

During a shadow system creation stage (block 520), a shadow system used during an upgrade of an original system may be defined. In some embodiments, one or more modification instructions associated with one or more original database objects can be implemented within the shadow system. In some embodiments, one or more modification conditions can also be applied within the shadow system. In some embodiments, one or more original database objects may be designated for incremental conversion and/or an incremental conversion list of designated database objects may be defined during the shadow system creation stage (block 520).

During the pre-downtime stage (block 530), an incremental conversion list can be manipulated. For example, the incremental conversion list may be modified by an administrator. In some embodiments, the administrator may add one or more identifiers representing one or more original database objects so that the one or more original database objects may be modified based on an incremental conversion process. In some embodiments, the administrator (or other user) may remove one or more identifiers representing one or more original database objects so that one or more original database objects may not be modified based on an incremental conversion process. In some embodiments at least a portion of an incremental conversion process, such as the preparation time period 320 of the incremental conversion process shown in FIG. 3, may be performed during a partial downtime of the original system within the Pre-Downtime Stage of the system upgrade.

During a downtime initiation stage (block 540), a downtime of the original system may be initiated for a portion of an upgrade process. In some embodiments at least a portion of an incremental conversion process, such as the data transfer time period 330 of the incremental conversion process shown in FIG. 3, may be performed during the downtime initiation stage of the original system.

During an adaptation of databases stage (block 550), one or more database objects may be structurally adapted and/or semantically adapted. In some embodiments, the database objects can be, for example, business-related database objects. In some embodiments, switch of one or more database objects from an original system to the target structure and content, such as shown in FIG. 3, may be performed during the adaptation of databases stage 550. In some embodiments, an original system may be in a down state during at least a portion of the adaptation of databases state.

Figure 6:
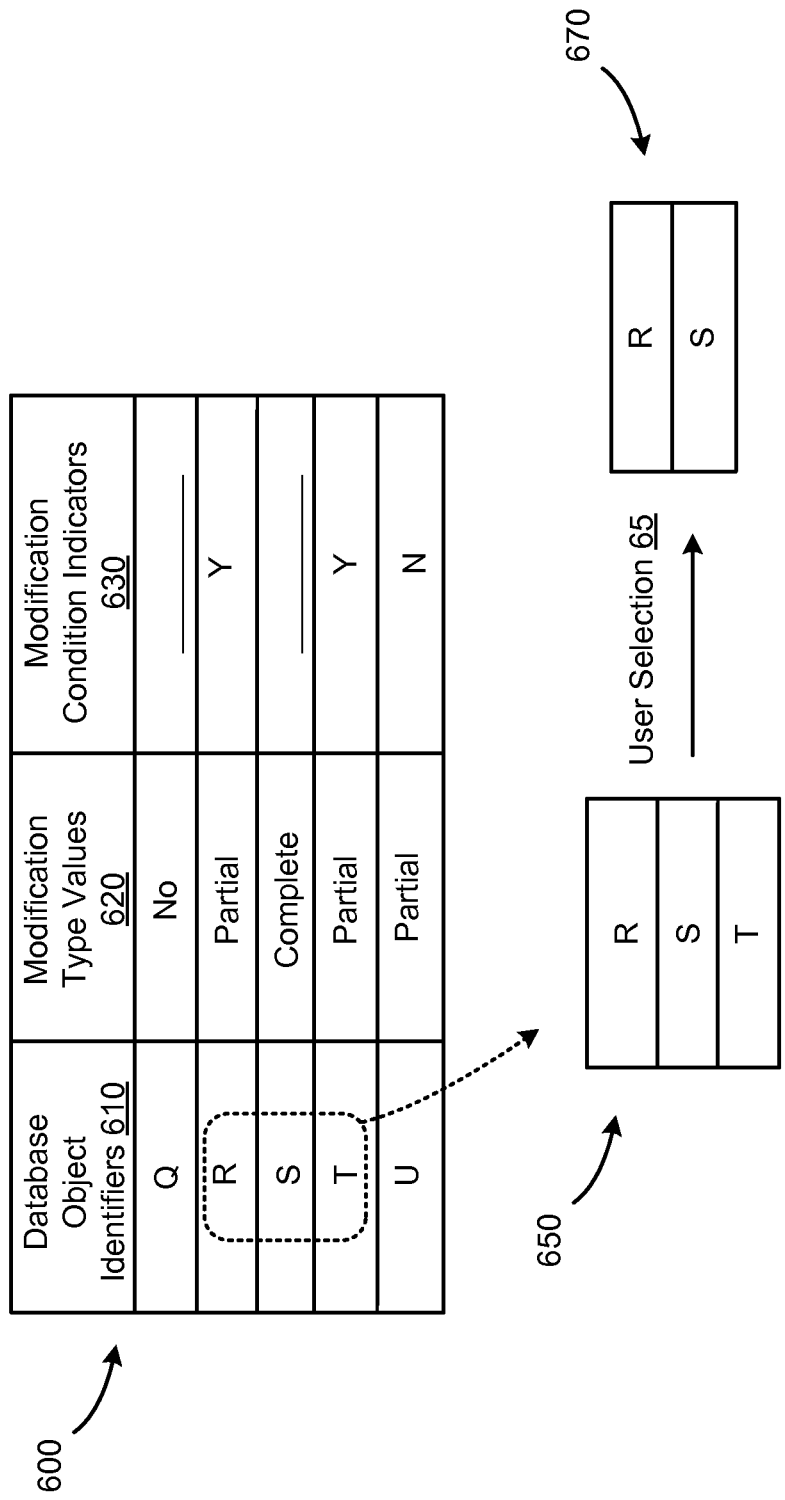
FIG. 6 is a diagram of a database that illustrates information about original database objects from an original system.

FIG. 6 is a diagram of a database 600 that illustrates information about original database objects from an original system. As shown in FIG. 6, the database 600 includes database object identifiers 610 representing original database objects from the original system. The database object identifiers 610 include identifiers Q, R, S, T, and U. In some embodiments, a database object represented by one of the database object identifier 610 can simply be referred to by that identifier. For example, a database object represented by database object identifier Q (shown in column 610) can be referred to as database object Q.

Each of the database object identifiers 610 is associated with a modification type value 620 (shown on the same row as the database object identifiers 610). Each of the modification type values 620 can be defined based on a comparison of each of the database objects represented by the database object identifiers 610 and a set of target upgrade database objects (not shown). The comparison can be performed by and the modification type values 620 can be defined by a database comparator, such as database comparator 161 shown in FIG. 1.

As shown in FIG. 6, each of the database objects represented by the database object identifier 610 may be associated with one of the modification condition indicators 630. The modification condition indicators 630 can each indicate whether or not a modification condition (such as the modification condition 50 described in connection with FIG. 1) has been satisfied. When the modification condition has been satisfied, the database object associated with the satisfied modification condition can be designated for incremental conversion.

For example, as shown in FIG. 6, database object R, which is subject to partial modification, may be designated for incremental conversion because the modification condition has been satisfied as illustrated by the modification condition indicator Y shown in column 630. Database object U, which is subject to partial modification, may be not be designated for incremental conversion because the modification condition has not been satisfied as illustrated by the modification condition indicator N shown in column 630. In some embodiments, a determination as to whether or not a modification condition has been satisfied can be performed by a modification module such as modification module 163 shown in FIG. 1.

As shown in FIG. 6, a candidate incremental conversion list 650 is defined based on a combination of modification type value 620 and the modification condition indicators 630. Specifically, the candidate incremental conversion list 650 includes database objects R, S, and T. Database objects R and T are included in the candidate incremental conversion list 650 because these databases are subject to partial modification and at least one modification condition associated with each of these databases has been satisfied (as indicated by the modification condition indicators Y (shown in column 630) associated with each of these databases). Database object U is not included in the candidate incremental conversion list 650 because a modification condition associated with database object U is not satisfied (as indicated by the modification condition indicator N (shown in column 630) associated with this database object). The database object S is included in the candidate incremental conversion list 650 because this database object is subject to complete modification, and, in this embodiment, is designated for incremental conversion by default.

As shown in FIG. 6, a final incremental conversion list 670 is defined based on a user selection 65 from the candidate incremental conversion list 650. In other words, the final incremental conversion list 670 is defined in response to selections from the candidate incremental conversion list 650 by a user (e.g., an administrator). In this embodiment, database objects R and S are selected from the candidate incremental conversion with 650 for inclusion in the final incremental conversion list 670, and database object T is excluded from the final incremental conversion list 670. In some embodiments, one or more of the database objects identified within a candidate incremental conversion list (such as incremental conversion list 650) can be removed based on a user preference and/or based on one or more additional modification conditions applied after the candidate incremental conversion list 650 has been defined.

Although not shown in FIG. 6, one or more database objects not originally identified for incremental conversion in the candidate incremental conversion list 650 can be added to the candidate incremental conversion list 650 and/or the final incremental conversion list 670. For example, although database object U was not originally included in the candidate incremental conversion list 650 because a modification condition associated with database object U was not satisfied, database object U could be added manually by a user, and/or automatically based on a user preference, to the candidate incremental conversion list 650 (and/or the final incremental conversion list 670).

Although not shown, in some embodiments, the techniques described herein may be applied to modification (e.g., complete modification, partial modification) of one or more database objects (from an original system) outside of an upgrade process. For example, the techniques described herein can be used to downgrade one or more database objects. In some embodiments, the techniques described herein can be used to modify one or more database objects during system maintenance that may not be related to an upgrade process.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions stored on a non-transitory computer-readable storage medium, the computer system comprising:
    a database upgrade module configured to upgrade a first database object from an original system during a downtime stage and upgrade a second database object from the original system during a pre-downtime stage, the pre-downtime state being a state in which a first portion of the original system is in a down state and a second portion of the original system is in an up state, the database upgrade module comprising:
        a database comparator configured to identify, during the pre-downtime stage, a first database object from an original system for a complete modification based on a comparison of the first database object with a plurality of target upgrade database objects, and configured to identify a second database object from the original system for a partial modification based on a comparison of the second database object with the plurality of target upgrade database objects;
        a complete modification module configured to designate, in response to the identification of the first database object and during the pre-downtime stage, the first database object for the complete modification based on an incremental conversion process;
        a modification instruction module configured to define, during the pre-downtime stage, an instruction to implement the partial modification; and
        a partial modification module configured to designate, during the pre-downtime stage, the second database object for the partial modification based on the incremental conversion process when the instruction to implement the partial modification satisfies at least a portion of a modification condition, wherein
        the database upgrade module is further configured to execute the instruction to implement the partial modification, including modifying the second database object, during the pre-downtime stage, and
        the database upgrade module is further configured to execute an instruction to implement the complete modification, including modifying the first database object, during the downtime stage.

2. The computer system of claim 1, further comprising:
    an incremental conversion execution module configured to perform at least a portion of the partial modification during the incremental conversion process by transferring data of the second database object into an upgrade database object when the original system is in an up state.

3. The computer system of claim 1, wherein the modification condition is satisfied when the instruction to implement the partial modification includes at least one of an index creation instruction or an add field instruction.

4. The computer system of claim 1, wherein the modification condition is satisfied when the second database object has a size greater than a threshold value.

5. The computer system of claim 1, further comprising:
    an incremental conversion execution module configured to perform the complete modification of the first database object based on the incremental conversion process by changing each field from a plurality of fields of the first database object into a field of a first upgraded database object, and configured to perform the partial modification of the second database object based on the incremental conversion process by changing all of the fields from a plurality of fields of the second database object into a plurality of fields of a second upgraded database object.

6. The computer system of claim 1, wherein:
    the database comparator is configured to identify a third database object from the original system for a partial modification based on a comparison of the third database object with the plurality of target upgrade database objects,
    the partial modification module is configured to exclude the third database object from the incremental conversion process when the third database object is scheduled for the partial modification based on a process mutually exclusive with the incremental conversion process.

7. The computer system of claim 1, wherein the database comparator is configured to determine that a third database object from the original system is not subject to modification based on a comparison of the third database with the plurality of target upgrade database objects.

8. The computer system of claim 1, wherein:
    the database comparator is configured to identify a third database object from the original system for a partial modification based on a comparison of the third database object with the plurality of target upgrade database objects,
    the partial modification module is configured to designate the third database object for the partial modification during a downtime of the original system after the incremental conversion process has been completed.

9. The computer system of claim 1, wherein the partial modification module is configured to determine that each database object from a first plurality of database objects does not satisfy the modification condition, and is configured to designate the first plurality of database objects for partial modification during a downtime of the original system after the incremental conversion process is performed during the uptime of the original system, the first database object and the second database object being included in a second plurality of database objects different from the first plurality of database objects.

10. The computer system of claim 1, further comprising:
a conversion list module configured to include an identifier of the first database object in an incremental conversion list in response to the first database object being designated for the complete modification based on the incremental conversion process and configured to include an identifier of the second database object in the incremental conversion list in response to the second database object being designated for the partial modification based on the incremental conversion process; and
an incremental conversion scheduler configured to schedule, based on the incremental conversion list, the first database object and the second database object for processing based on the incremental conversion process.

11. The computer system of claim 1, further comprising:
a conversion list module configured to include an identifier of the first database object in an incremental conversion list in response to the first database object being designated for the complete modification based on the incremental conversion process and configured to include an identifier of the second database object in the incremental conversion list in response to the second database object being designated for the partial modification based on the incremental conversion process, the conversion list module configured to remove at least one of the identifier of the first database object or the identifier of the second database object from the incremental conversion list in response to an instruction from a user; and
an incremental conversion scheduler configured to schedule the incremental conversion process based on the incremental conversion list.

12. The computer system of claim 1, wherein the database comparator is configured to identify the first database object and to identify the second database object during a time period when a shadow system, as the temporary system, is produced,
the computer system further comprising:
a conversion list module configured to define an incremental conversion list including an identifier of the first database object and an identifier of the second database object after the shadow system is produced and before a downtime of the original system.

13. The computer system of claim 1, wherein the partial modification module is configured to designate a first portion of a plurality of database objects including the second database object for partial modification based on the incremental conversion process, and configured to exclude, based on at least a portion of the modification condition, a second portion of the plurality of database objects from processing based on the incremental conversion process,
the computer system further comprising:
an incremental conversion scheduler configured to schedule a subset of database objects from the plurality of database objects for processing based on the incremental conversion process in response to a plurality of selections by a user.

14. The computer system of claim 1, wherein at least a portion of the partial modification is performed, based on the incremental conversion process, within a shadow system, as the temporary system, during an upgrade of the original system.

15. A non-transitory computer-readable storage medium storing code representing instructions that when executed are configured to cause a processor to perform a process, the code comprising code to:
during a pre-downtime stage, the pre-downtime state being a state in which a first portion of the original system is in a down state and a second portion of the original system is in an up state:
identify a first database object from an original system for a complete modification based on a comparison of the first database object with a plurality of target upgrade database objects;
designate, in response to the identification of the first database object, the first database object for the complete modification based on an incremental conversion process;
identify a second database object from the original system for a partial modification based on a comparison of the second database object with the plurality of target upgrade database objects;
define an instruction to implement the partial modification;
designate the second database object for the partial modification based on the incremental conversion process when the instruction to implement the partial modification satisfies at least a portion of a modification condition; and
execute the instruction to implement the partial modification that includes modifying the second database object; and
during a downtime stage:
execute an instruction to implement the complete modification that includes modifying the first database object.

16. The non-transitory computer-readable storage medium of claim 15, further comprising code to:
include an identifier of the first database object in an incremental conversion list in response to the first database object being designated for the complete modification based on the incremental conversion process and configured to include an identifier of the second database object in the incremental conversion list in response to the second database object being designated for the partial modification based on the incremental conversion process; and
schedule, based on the incremental conversion list, the first database object and the second database object for processing based on the incremental conversion process.

17. The non-transitory computer-readable storage medium of claim 15, wherein the modification condition is satisfied when the instruction to implement the partial modification includes at least one of an index creation instruction or an add field instruction, and when the second database object has a size greater than a threshold value.

18. A method including executing instructions recorded on a non-transitory computer-readable storage media using at least one processor, the method comprising:
during a pre-downtime stage, the pre-downtime state being a state in which a first portion of the original system is in a down state and a second portion of the original system is in an up state:
identifying a first database object from an original system for a complete modification based on a comparison of the first database object with a plurality of target upgrade database objects;

designating, in response to the identification of the first database object, the first database object for the complete modification based on an incremental conversion process;

identifying a second database object from the original system for a partial modification based on a comparison of the second database object with the plurality of target upgrade database objects;

defining an instruction to implement the partial modification;

designating the second database object for the partial modification based on the incremental conversion process when the instruction to implement the partial modification satisfies at least a portion of a modification condition; and executing the instruction to implement the partial modification that includes modifying the second database object; and during a downtime stage:

executing an instruction to implement the complete modification that includes modifying the first database object.

19. The method of claim 18, further comprising:

including an identifier of the first database object in an incremental conversion list in response to the first database object being designated for the complete modification based on the incremental conversion process and configured to include an identifier of the second database object in the incremental conversion list in response to the second database object being designated for the partial modification based on the incremental conversion process; and scheduling, based on the incremental conversion list, the first database object and the second database object for processing based on the incremental conversion process.

20. The method of claim 18, wherein the modification condition is satisfied when the instruction to implement the partial modification includes at least one of an index creation instruction or an add field instruction, and when the second database object has a size greater than a threshold value.

* * * * *